Oct. 29, 1963 J. W. MARTIN 3,108,470
HIGH SPEED TONNAGE INDICATOR FOR POWER PRESS
Filed March 28, 1960 2 Sheets-Sheet 2

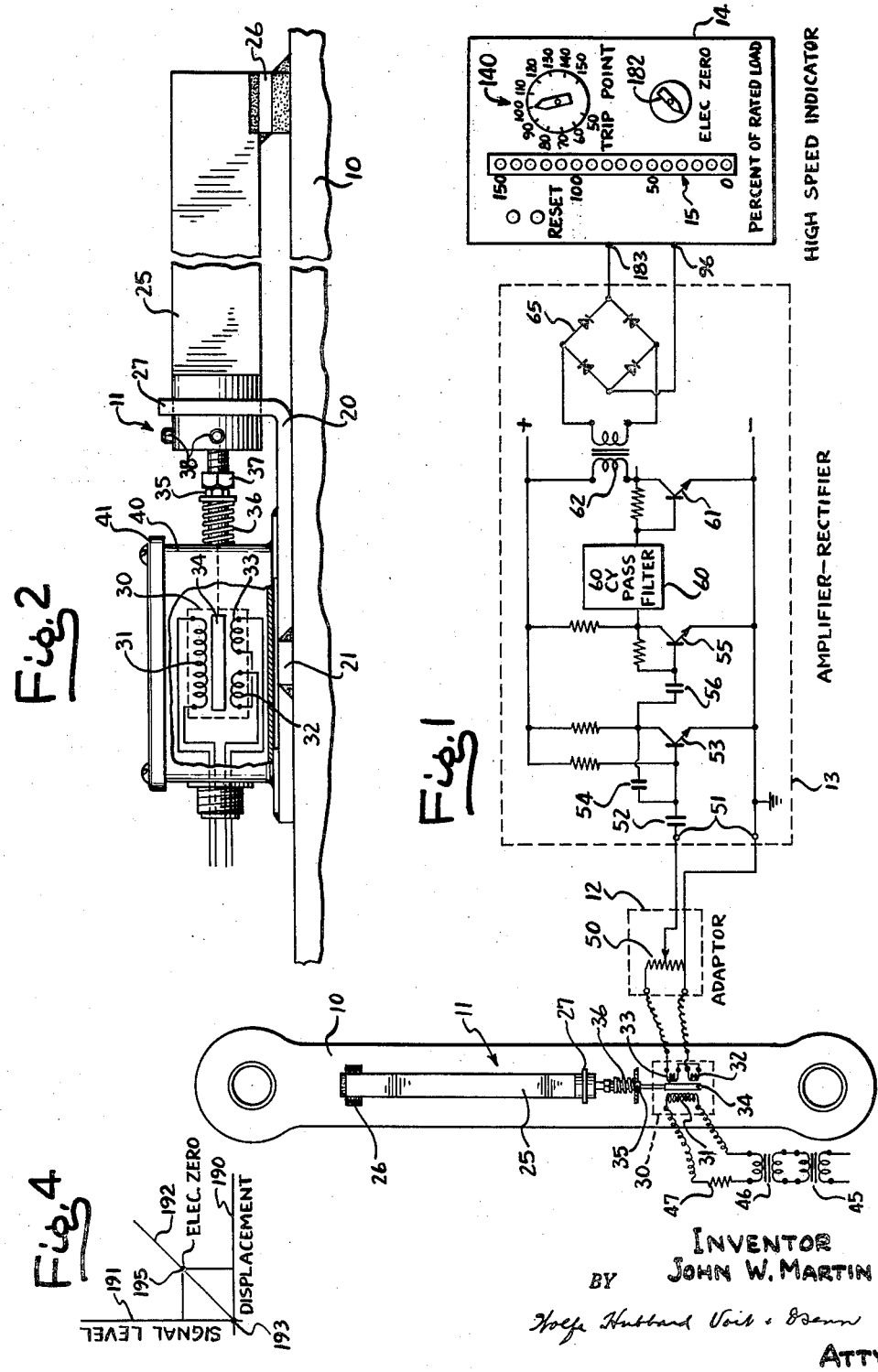

INVENTOR
JOHN W. MARTIN
BY
Hoefle Hubbard Voit & Osann
ATTYS.

United States Patent Office 3,108,470
Patented Oct. 29, 1963

3,108,470
HIGH SPEED TONNAGE INDICATOR FOR POWER PRESS
John W. Martin, Oak Park, Ill., assignor to Danly Machine Specialties, Inc., Chicago, Ill., a corporation of Illinois
Filed Mar. 28, 1960, Ser. No. 18,030
7 Claims. (Cl. 73—88.5)

The present invention relates to power presses and more particularly to means for indicating the instantaneous press loading or "tonnage," for example, in terms of percent of rated load, in successive operating cycles.

It is an object of the present invention to provide a novel arrangement for measuring and indicating the loading in the pitman or other member of a power press through a continuous succession of operating cycles. It is another object to provide a constantly indicating load or "tonnage" indicator having a high degree of accuracy. More specifically it is an object to provide a tonnage indicator arrangement which is instantaneously responsive and free of the inertia effects or time lags which characterize conventional force measuring systems employing meters or other responsive devices of an electromechanical nature.

It is a related object to provide a tonnage indicator which is highly sensitive and which can be used to measure the stress in parts of massive cross section which undergo a total change in length, under full load conditions, on the order of a few thousandths of an inch but which is, nevertheless, stable in operation exhibiting negligible drift or hysteresis effect. Thus the arrangement overcomes the difficulties associated with prior devices of this type which have simply depended upon using excessive electrical gain to compensate for extremely small total distortion at rated load. It is a related object to provide a tonnage indicator capable of use with a power press which is not a delicate "laboratory" device intended for occasional usage but which is instead a stable device capable of giving consistent quantitative information during the day-by-day operation of a power press through many thousands of cycles of operation and under the conditions existing in a heavy manufacturing plant.

In this connection it is an object to provide a tonnage indicator which does not require the services of a trained technician, which is easy to adjust, and which may therefore be used by the regular personnel operating the press with a high degree of confidence and reliability and without any special instruction or training. In one of the detailed aspects of the invention it is an object to provide a tonnage measuring device which gives constant verification of proper adjustment.

It is still another object to provide a tonnage indicator which gives a graphic display of instantaneous loading and which is easily read and understood. It is a more specific object to provide a display in the form of a "bobbing" column of light in which the height of the column gives a direct indication of transient loading. It is an object of the invention in one of its aspects to provide a tonnage indicator arrangement which is immediately responsive to increasing values of loading while retentive for decreasing values so that the indicator column does not fall to zero during the cycle but tends, on the contrary, to reciprocate through a limited range at the upper end of the scale, thus making it easier to secure accurate readings during rapid cycling of the press and with minimum visual strain.

It is another object of the present invention to provide a tonnage indicator capable of giving accurate indication of stress for positive values of loading while being unresponsive to stress in the opposite direction during the reverse or non-working portion of the cycle.

In one of its aspects it is an object of the present invention to provide a tonnage indicator which includes provision for "lock-out" or automatic disabling of the press upon exceeding a predetermined percentage of rated load and which is positively and instantaneously triggered upon achieving such percentage of load. It is a further object in this connection to provide a tonnage indicator having a lock-out device which may be easily adjusted to a predetermined operating point simply by turning a control knob.

Finally it is an object of the invention to provide a tonnage measuring system which, in spite of its sensitivity and accuracy, may be constructed at low cost using readily available components of a non-critical nature, which is simple and durable and which may be easily installed on presses of different sizes and different designs either at the time of manufacture or on presses already in the field.

Other objects and advantages of the invention will become apparent upon reading the attached detailed description and upon reference to the drawings in which:

FIGURE 1 is a diagram partially in block form showing a tonnage indicator system constructed in accordance with the present invention.

FIG. 2 is an elevational view of a tonnage sensing device employed in the present invention.

FIG. 4 is a plot of signal versus displacement and showing the condition of adjustment for "electrical zero."

Figure 3:
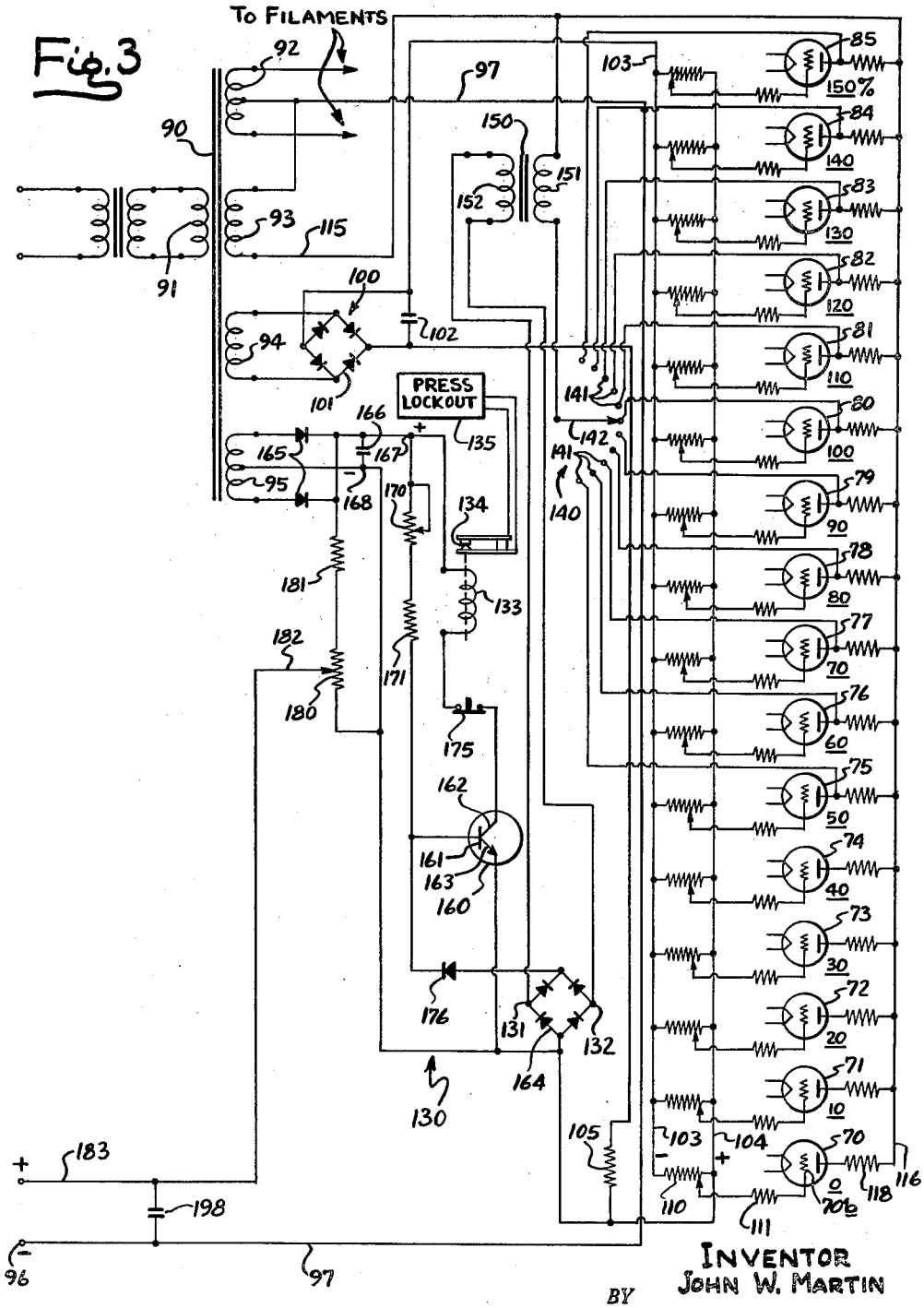
FIG. 3 is a schematic diagram showing the high speed indicator portion of the device.

While the invention has been described in connection with a preferred embodiment, it will be understood that we do not intend to be limited to the embodiment shown but intend to cover various modifications and alternative constructions and uses included within the spirit and scope of the appended claims.

Turning now to FIG. 1 of the drawings, there is shown a stressed member in the form of a pitman 10 forming a part of a power press having mounted thereon a sensing device generally indicated at 11 for sensing the change in dimension which occurs in the pitman as it is loaded or stressed during successive operating cycles of the press. The remainder of the press is not shown since it will be understood to be conventional and well understood by one skilled in the art. The sensing device produces an electrical output signal which is fed to an "adapter" 12, thence into an amplifier-rectifier 13 and a high speed indicator 14. The high speed indicator 14 provides visual indicating means generally indicated at 15 which in the present embodiment is in the form of a vertical column of gaseous discharge lamps with the height of the column of lighted lamps being dependent upon the instantaneous value of stress in the pitman 10. The visual effect is one of a bobbing column of light during successive power strokes of the press.

The sensing device 11 secured to the pitman is shown in FIG. 2 and forms the subject matter of copending application Ser. 17,946 filed March 28, 1960. For present purposes it will suffice to say that the device has a bracket 20 which is welded to the pitman at a localized mounting pad or lug 21. Extending in line with the bracket 20 is an elongated massive bar or extension rod 25 which is welded to the pitman at its far end at a localized region of support provided by a lug 26. It will be understood that the rod 25 may have a length of up to two feet or more with its "near" end slidably supported in a hole formed in the upturned portion 27 of the bracket 20, thereby restraining the rod against any lateral whipping action which may occur as the pitman undergoes orbital movement. It will be apparent to one skilled in the art that any strain which occurs in the pitman due to application of load is reflected in relative movement between the rod 25 and the bracket 20, the gauge length for reference purposes being the longitudinal spacing between the lug 21 and lug 26.

For the purpose of producing an electrical signal in accordance with the above mentioned relative movement, a displacement transducer 30, commonly referred to as a "differential transformer" is provided having a primary winding 31 and secondary windings 32, 33 coupled together by a reciprocable core 34. Movement is transmitted to the core 34 by a plunger 35 which is biased outwardly by means of a coil spring 36 surrounding the same. To provide adjustment between the plunger and the end of the rod, the rod includes an axially extending machine screw 37 locked in place by set screws 38.

In order to maintain the transducer 30 absolutely stationary on the pitman for relative movement of the core 34 with respect to it, the transducer is "potted" in a housing 40 having a cover 41 and filled with epoxy resin or other hard inert material. The housing 40 is securely welded to the bracket 20 and preferably symmetrically centered with respect to the mounting pad 21 which secures the bracket to the pitman.

For the purpose of providing constant excitation for the primary winding 31, a constant voltage transformer 45 is provided which feeds a stepdown transformer 46 having an output on the order of 25 volts. Connected in series with the output of the transformer and the primary winding of the transducer is a resistor 47 which drops the voltage to about 6 volts for stabilization purposes, the net effect of the arrangement being to produce substantially constant current through the primary winding in the face of voltage variations in the commercial supply line. It will be understood that under the core-centered or "null" condition the voltages induced in the secondary windings 32, 33 are in bucking relation so that no net output signal is produced; however, as the central core is displaced in one direction or the other from the null position, an A.-C. output signal is produced having a magnitude which is directly proportional to the displacement. For the other details of construction of the sensing unit and a discussion of the operating features thereof, reference is made to the above identified copending application.

For the purpose of changing the voltage output of the transducer for a given change in length of the pitman, a potentiometer 50 is included in the adapter 12. This potentiometer is employed as a sensitivity control which is set incident to adjusting the tonnage indicator and calibrating the same. A simplified adapter arrangement is disclosed and it will be understood by one skilled in the art that the adapter may include a voltage-combining network for combining voltages from two or more sensing devices to produce a net output signal suitable for feeding into the amplifier and indicator.

Turning next to the details of the amplifier unit 13, it will be understood that the signal applied to the input terminals thereof is of alternating voltage of a magnitude which is a small fraction of a volt, for example, on the order of a millivolt. The signal passes through a coupling capacitor 52 into a first transistor 53 where initial amplification takes place. The input signal has a high proportion of undesired harmonic components; to filter these out and to improve linearity of response, a negative feedback capacitor 54 is connected between the output and input of the transistor. Most of the feedback occurs at the unwanted higher frequencies so that the stage tends to favor the fundamental signal voltage. The signal is next fed to a transistor 55 via a coupling capacitor 56 for further amplification. At the output of the transistor 55 the signal is passed through a 60 cycle pass filter 60 which serves to remove any remaining harmonic components. The output of the filter 60 is fed to a third transistor 61 having a transformer 62 connected in its output circuit. Thus the signal fed to the transformer 62 is a linearly amplified and "purified" version of the A.-C. input signal. For the purpose of converting the signal to direct voltage, a bridge rectifier 65 is connected across the secondary winding of the transformer so that the final output signal of the amplifier unit is a direct voltage which varies in magnitude in accordance with the stress in the pitman.

In accordance with the present invention a column of gaseous discharge lamps is provided with the individual lamps having their inputs connected for response to the signal voltage and incrementally biased to turn the lamps on and off in sequence upon variations in the signal voltage so that the instantaneous value of the stress is visually indicated by the height of a "bobbing" column of light observed by the operator.

In the present instance the column of lamps 15 is made up of a series of sixteen lamps arranged one above the other and designated by the numerals 70–85 respectively. The input signal is fed to the cathodes, i.e., the filaments, of all of the lamps simultaneously. For the purpose of lighting the filaments a transformer 90 is provided having a primary winding 91 and secondary windings 92, 93, 94, 95, the purpose of which will become clear as the discussion proceeds. It will be noted in FIG. 3 that the input terminal, indicated at 96 is connected via a line 97 to the center tap of secondary winding 92 so that all of the filaments have an instantaneous potential which depends upon the magnitude of the direct voltage input signal.

In carrying out the present invention means are provided for biasing the grids of the respective lamps incrementally so that they ignite in succession. For this purpose a bias supply generally indicated at 100 is employed including a bridge rectifier 101 connected across the secondary winding 94 of the transformer and filtered by a capacitor 102. The bias supply is connected to first and second biasing lines indicated at 103, 104, respectively, with a resistor 105 being interposed in series. This establishes a negative bias potential on the line 103 relative to the potential on line 104.

Taking the lamp 70 by way of example, the bias for the lamp is set by picking off the desired potential from a potentiometer 110 which has its outer terminals connected across the bias lines, with the slider being connected to the grid 70b of the lamp via a series or isolating resistor 111. It will be understood that with the grid 70b adjusted to a predetermined potential, the lamp will ignite at such time that the cathode (filament) potential is raised to the igniting potential which is characteristic of the particular lamp being used. While the invention is not limited to use with any particular kind of grid controlled gaseous discharge lamp, I prefer to use the lamp commercially identified as CK1050 which has a cathode to grid ignition potential on the order of −2 volts.

Turning attention to the plate supply for all of the lamps, alternating voltage for this purpose is derived from the secondary winding 93 via a line 115 which is connected to a plate voltage bus 116. Again taking the lamp 70 by way of example, the plate circuit includes a dropping resistor 118 for limiting the current when the lamp fires. Moreover, as will later be spelled out in greater detail, the voltage drop occurring across the plate resistor 113 is employed to operate a relay for disabling the associated power press when a predetermined overload condition is reached.

It will be apparent from what has been said above that as the direct voltage input signal at the input terminal 96 increases upon an increase of loading of the press starting from zero load, the lamps 70—85 will be lighted in succession giving the effect of a solid vertical column of light. Since gaseous discharge lamps by their nature are free of any time lag, it will be apparent that there will be no delay or inertia and the lamps will indicate the instantaneous value of the stress regardless of the rapidity with which the stress may increase during a typical press operating cycle. Also, since the lamps are of the grid controlled type, the lamps will be immediately extinguished when the point of cut-off bias is reached in the opposite or decreasing direction.

In accordance with one aspect of the present invention novel means are provided for disabling the press upon achieving a predetermined overload condition; more specifically, a selector means including a relay is provided for disabling the press when a selected lamp in the series is operated. To accomplish this a relay circuit 130 is used having input terminals 131, 132 feeding a relay 133 having contacts 134. The latter serve to control any desired type of press lock-out or disabling mechanism graphically indicated at 135. For the purpose of applying an input signal to the input terminals 131, 132, a selector switch, or tap switch 140 is employed having terminals 141 and a wiper arm 142, with the terminals 141 being connected to the plate ends of the respective plate dropping resistors 118 and the wiper arm being connected to the plate bus 116. As will be apparent to one skilled in the art, the voltage of the terminals 141 is zero with respect to the wiper until such time as the corresponding lamp ignites whereupon the voltage jumps abruptly. Let it be assumed, for example, that the wiper 142 is adjusted to the terminal which is connected to the plate dropping resistor of the lamp 81 corresponding to 110% loading of the press. The alternating voltage at the wiper will then remain zero until such time as 110% of rated load is achieved whereupon a triggering voltage will appear for application to the input terminals of the relay circuit. For the purpose of isolating the two circuits and for securing a desired level of control voltage, a transformer 150 is provided having a primary winding 151 and a secondary winding 152 bridged across the input terminals 131, 132 of the relay circuit.

Turning to the relay circuit 130 in greater detail, it will be noted that a transistor 160 is employed having a base 161 which forms the input, a collector 162 which comprises the output circuit, and a common emitter 163. In order to convert the alternating input signal to direct voltage for operating the transistor, a bridge rectifier 164 is employed made up of four diodes connected as shown. For supplying direct voltage for the load circuit of the transistor, a direct voltage supply is provided including full wave rectifiers 165 connected to the secondary winding 95 of the transformer. The output voltage of the rectifier is filtered by a capacitor 166 for energizing a positive terminal 167 and a negative terminal 168 with pure direct voltage.

In accordance with one of the detailed aspects of the invention means are provided for biasing the transistor 160 to provide for quiescent current flow through the relay 133 under conditions of zero input signal, with the quiescent current being of sufficient magnitude as to keep the relay held in or energized once it has been triggered by an input signal at terminals 131, 132. This bias condition is established by a rheostat 170 and series resistor 171 connected between the positive terminal 167 and the base terminal of the transistor as shown. As will be apparent to one skilled in the art the rheostat may be adjusted so as to provide current flow through the collector circuit of a magnitude sufficient to hold in the particular relay 133 being used. In order to permit the relay 133 to drop out once it has been energized, a normally closed reset button 175 is provided in series therewith.

As a further feature of the circuit, means are provided for isolating the circuit against the effect of changes in temperature upon the diodes which comprise the bridge rectifier 164 at the input. These rectifiers may be conveniently of the germanium type which are temperature responsive in that upon an increase in temperature there occurs a decrease in the back resistance. Since the bridge rectifier 164 effectively shunts the transistor biasing circuit, it will be apparent to one skilled in the art that an increase in temperature might upset the desired conditions of bias. Accordingly an auxiliary diode 176 is placed in series with the output terminals of the bridge rectifier so oriented that changes in the back resistance of the rectifier can have no effect upon the loading of the bias circuit. This permits the relatively low cost germanium diodes to be employed in the bridge rectifier without the risks usually attached to the use of such diodes.

In accordance with a further feature of the invention means are provided for insuring visual indication of stress only when the change is in the positive or "loading" direction, with the device being non-responsive to stress in the reverse direction, by establishing an offset reference point or "electrical zero." The latter is brought about by use of an auxiliary source of direct voltage in series with the regular direct input signal and by predetermined adjustment at the sensing unit. In order to understand the significance of this "electrical zero" it must be kept in mind that the responsive circuit described herein is extremely sensitive and would be responsive to departures of the movable core in the transducer in either the positive or negative direction. Consequently it is desirable to be able to control the "threshold" condition of the lamps and to insure that the indicator circuit does not give a rising column of light during the "retract" portion of the press cycle. Equally important, the ability to control the "threshold" condition of the lamps makes it possible to compensate for departures of the movable core in the transducer in either the positive or negative direction which might be caused by rapid temperature variations, extreme shock or other such similar conditions.

The establishing of the "electrical zero" will become clear upon consideration of a typical adjusting and calibrating sequence. However, prior to reviewing such sequence it will be desirable to refer to the source of auxiliary direct voltage. Carrying out the invention an auxiliary voltage potentiometer 180 is employed having its outer terminals connected across a suitable source of direct voltage. In the present instance the transistor D.-C. voltage source is used, the potentiometer having its outer terminals connected across power supply terminals 167, 168 with a series resistor 181 being arranged in series with one side of the potentiometer to establish a predetermined range of adjustment. The wiper arm 182 of the potentiometer is, as shown, connected directly to the input line 183. That the input signal voltage and auxiliary voltage are in series will be seen upon tracing the total input circuit in FIG. 3. Thus the circuit starts at terminal 96 which is connected via line 97 to the cathodes of all of the discharge lamps. The return circuit from the grids of the lamps is completed through the positive bias line 104 which, as will be noted, is connected to one side of the auxiliary voltage potentiometer 180, with the slider of the latter being connected to the second input terminal 183 thus closing the input loop. The knob which controls the auxiliary voltage potentiometer 180 is made conveniently accessible at the panel of the high speed indicator 14 (see FIG. 1) and the operator is simply instructed to set the knob before operating the press at a setting which will ignite only the first or lowermost lamp in the column corresponding to zero loading. Thus the operator rotates the "electrical zero" knob clockwise until only the lowermost lamp turns "on." Thereafter, as long as the first lamp and only the first lamp is lit the operator is assured that readings will be accurate with no readjustment necessary.

The procedure for initially establishing operating conditions for the tonnage indicator may be briefly outlined as follows: As a first step the bias adjusting potentiometers 110 are adjusted for incremental settings so that the voltage "offset" from one lamp to the next is constant throughout the entire series. The auxiliary voltage potentiometer 180 is then adjusted to produce zero output voltage; in other words, the only input voltage to be applied to the circuit of FIG. 3 is that which enters at the input terminals 96, 183.

Next the sensing unit is adjusted by turning the adjusting screw 37 in one direction or the other to provide zero output voltage at the displacement transducer. Following this the press is artificially loaded to 100% of its rating by means of a hydraulic jack or the like in order to develop rated stress in the pitman 10. This produces an output voltage which causes ignition of the lamps in the column 15. The sensitivity control 50 is then rotated so that the lamps light only to the level corresponding to 100% of loading. In the device disclosed herein this would correspond to the lighting of the first eleven lamps in the series. This completes the calibration portion of the procedure and the hydraulic jack may be unloaded. In order to insure response only in the positive direction of loading, the sensing device is mechanically offset with respect to the pitman by arbitrarily turning the adjusting screw 37 therein to produce ignition of the lamps to, say, the "40%" level. In order to compensate for this and to reestablish the "zero" condition at the lamps, the auxiliary voltage potentiometer 180 is moved from its zero position into the central portion of its range where sufficient auxiliary voltage is produced as to buck the input voltage thereby turning off all the lamps except the lowermost or "zero" lamp.

The latter portion of the adjusting procedure may be understood in graphical terms upon reference to FIG. 4 which is a plot of displacement 190 against signal level 191. Normally the straight line relating there two quantities and indicated at 192 passes through the origin 193. It will be apparent that where this occurs the slightest displacement in either the positive or negative direction will be effective to produce signal voltage, i.e., effective to light the indicator lamps. Thus any incidental movement of the core in the transducer in the negative direction may produce inadvertent lighting of the lamps. In this connection it is important to keep in mind that full output of the transducer corresponding to 100% of rated loading of the press may correspond to a displacement over the gauged distance of only about one thousandth of an inch. It will therefore be apparent that movement of the core in the "wrong" direction to the extent of only millionths of an inch of displacement might be capable of lighting the lower lamps of the series. The final turning of the adjustment screw 37 has the effect of displacing the core 34 of the transducer in the positive or "loading" direction to produce a "positive" output signal even under zero load conditions or conditions of moderate reversed loading. Since the adding of the auxiliary or bucking voltage to the input signal exactly compensates for the quiescent voltage from the transducer, an electrical zero is established at 95 (FIG. 4). The use of this arbitrary "electrical zero" and its ready availability to the press operator tends to make the operation of the sensitive circuit foolproof even under conditions of rough factory usage.

As a further feature of the present invention means are provided for inhibiting the drop in the lighted column without affecting the instantaneousness of response in the direction of increased loading. This is brought about simply by placing a capacitor 198 in parallel with the input terminals of the indicator unit, i.e., across the terminals of the bridge rectifier 65. Since the rectifier has a low resistance in the "forward" direction, the RC time constant is extremely short resulting in prompt charging or close "following" of the capacitor as the loading is increased, with instantaneous progressive lighting of the column of lamps. However, during the "decrease" portion of the cycle the effective resistance across the capacitor is high so that the charge leaks off relatively slowly. This causes the lamps to "hang on," to tend to remain lit. The net effect is that the lamps in the series light up rapidly, but the column of light falls at a slow rate dependent upon the amount of capacitance employed. Where the press is rapidly cycled, as in normal operation, the column of light instead of falling to zero between cyclical peaks may thus only fall to 60 or 70% of loading. Thus as viewed by the operator a "bobbing" column of light is seen which appears to vary over a relatively limited range at the upper end of the scale. The decreased amount of movement brought about by the use of the capacitor makes the column of light much easier for the eye to follow at rapid repetitive rates and it is an easy matter to read the peak loading in terms of the maximum height of the column using the adjacent scale calibrated in percentage.

It will be apparent then that the press operator need be instructed only to set the relay tripping point to a predetermined percentage of overload and to adjust the "electrical zero" control to the point where only the lowermost lamp is ignited. From that point on operation is automatic; the maximum loading is at all times clearly displayed and the press is immediately and automatically disabled in the event that the predetermined overload is exceeded.

In the copending application the features and advantages of the disclosed sensing unit 11 are set forth, including such factors as substantial independence of changes in ambient temperature and lack of any "mechanical hysteresis" under practical press operating conditions. Utilizing the extremely low level output signal from the transducer, the present circuit evidences a high degree of stability and, once adjusted, lack of any "electrical hysteresis." Accuracy and consistency are achieved and tests have demonstrated that, using the present arrangement, the loading indicated by the columns of light responds closely to the instantaneous loading which actually exists in the pitman or other part to which the sensing unit is attached. Since the response of the light column is instantaneous the lag or inertia associated with moving coil indicators or other indicators of the electro-mechanical type is avoided.

While the invention has been described in the measurement of stress in a power press and has particular advantage in combination therewith, it will be understood that the invention is not limited thereto but is applicable wherever analogous needs and operating conditions are encountered.

In the following claims the term "column" is employed to describe the gaseous discharge lamps; however, it shall be understood that the term is not used in a limited sense but rather in the sense of a progressive series.

I claim as my invention:

1. An indicator for use with a power press or the like having means for providing an electrical output signal in accordance with the stress imposed on the press in successive operating cycles comprising, in combination, an amplifier for amplifying the output signal, visual indicator means coupled to said amplifier and providing a column of light, said indicator means being so constructed and arranged that the length of the column is indicative of the stress in the press so that operation of the press is accompanied by a bobbing column of light with the peak value being indicative of the maximum stress developed in the press, and means for inhibiting the dropping of the column of light while leaving the column free to respond instantaneously to changes of signal in the rising direction so that bobbing is restricted to the upper portion of the range.

2. An indicator for use with a power press or the like having means for providing an electrical output signal in accordance with the stress imposed on the press in successive operating cycles comprising, in combination, an amplifier for amplifying the output signal, indicator means including a column of gaseous discharge lamps having their input circuits coupled to the output of the amplifier and so connected and arranged that they ignite in succession upon an increase in the voltage signal and go out in reverse sequence upon a reduction in the signal so that the stress is indicated by a cyclically bobbing column of light, and means associated with the lamps for inhibiting the rate of drop of the column of light during the stress-reducing portion of the press cycle while permitting instantaneous response of the lamps with instantaneous build-up of the light column in the stress-increasing portion of the press cycle.

3. An indicator for use with a power press or the like having means for providing an A.-C. electrical output signal in accordance with the stress imposed on the press in successive operating cycles comprising, in combination, an amplifier for amplifying the voltage output and for converting the same to a direct voltage proportional therewith at the amplifier output terminals, a column of gaseous discharge lamps having their input circuits coupled to the output fo the amplifier and including means for biasing the lamps incrementally so that they ignite in succession upon an increase in the direct voltage signal, said lamps having means for extinguishing the same in reverse sequence upon a reduction in the signal so that the stress is indicated by a bobbing column of light, and a capacitor connected across the amplifier terminals for inhibiting the rate of drop of the column of light during the stress-reducing portion of the press cycle.

4. An indicator for use with a power press or the like having means for providing an electrical output signal in accordance with the stress imposed on the press in successive operating cycles comprising, in combination, a column of gaseous discharge lamps having their input circuits coupled to the output signal and having means for biasing the same incrementally so that they ignite in succession upon an increase in the direct voltage signal and go out in reverse sequence upon a reduction in the signal with the result that the stress is indicated by a cyclically bobbing column of light, a capacitor connected across the direct output signal, and means associated with the capacitor for allowing the same to become charged immediately in response to an increase in direct voltage but for causing the same to discharge relatively slowly upon a decrease in direct voltage so that bobbing of the light column is restricted to the upper portion of the range.

5. A tonnage indicator for a power press comprising, in combination, a sensing unit on said press so constructed and arranged as to produce a signal voltage in accordance with the instantaneous value of stress developed in the press in the positive and negative sense, an amplifier for amplifying the signal voltage, a visual indicator including a column of gaseous discharge lamps having their input circuits coupled to the output of the amplifier and having means for incrementally biasing the same so that the lamps ignite in succession upon an increase in signal voltage and go out in reverse sequence upon a decrease in signal voltage, said sensing means including provision for adjusting the same to provide an output voltage corresponding to loading in the positive sense under conditions of zero stress, and means for producing an auxiliary voltage adjustable in magnitude and connected in series with the signal voltage for establishing a zero reference condition at the lamps thereby to insure that the lamps will be ignited only by change of stress in the positive sense.

6. A tonnage indicator for a power press comprising, in combination, a sensing unit on said press so constructed and arranged as to produce a signal voltage in accordance with the instantaneous value of stress developed in the press in both the positive and negative sense, an amplifier for amplifying the signal voltage, visual indicator means connected to the amplifier and including a visual indicator movable over a range in response to variations in the signal voltage but having means for inhibiting the rate of decrease from a peak value, said sensing means including provision for offsetting the same in the positive direction so that it produces a reference value of output voltage under conditions of zero stress, and means for producing an auxiliary voltage for effectively bucking the reference voltage so that the indicator reads zero for zero stress and so that the indicator responds to stress in the positive sense while being non-responsive to minor values of stress in the negative sense.

7. A tonnage indicator for a power press comprising, in combination, a sensing unit on said press so constructed and arranged as to produce a signal voltage in accordance with the instantaneous value of stress developed in the press in both the positive and negative sense, an amplifier for amplifying the signal voltage, visual indicator means including a visual indicator movable over a range in response to variations in the signal voltage but having means for inhibiting the rate of decrease from a peak value, and means for causing the indicator means to be solely responsive to stress in the positive sense.

References Cited in the file of this patent

UNITED STATES PATENTS

| | | |
|---|---|---|
| 2,094,645 | Foulke | Oct. 5, 1937 |
| 2,445,880 | Hathaway et al. | July 27, 1948 |
| 2,519,853 | Rossell | Aug. 22, 1950 |
| 2,817,815 | Evans | Dec. 24, 1957 |
| 2,961,872 | Metzmeier et al. | Nov. 13, 1960 |